M. W. SEWALL.
BOILER FURNACE.
APPLICATION FILED MAR. 12, 1910.
1,007,805.
Patented Nov. 7, 1911.
2 SHEETS—SHEET 1.
Fig. 1,
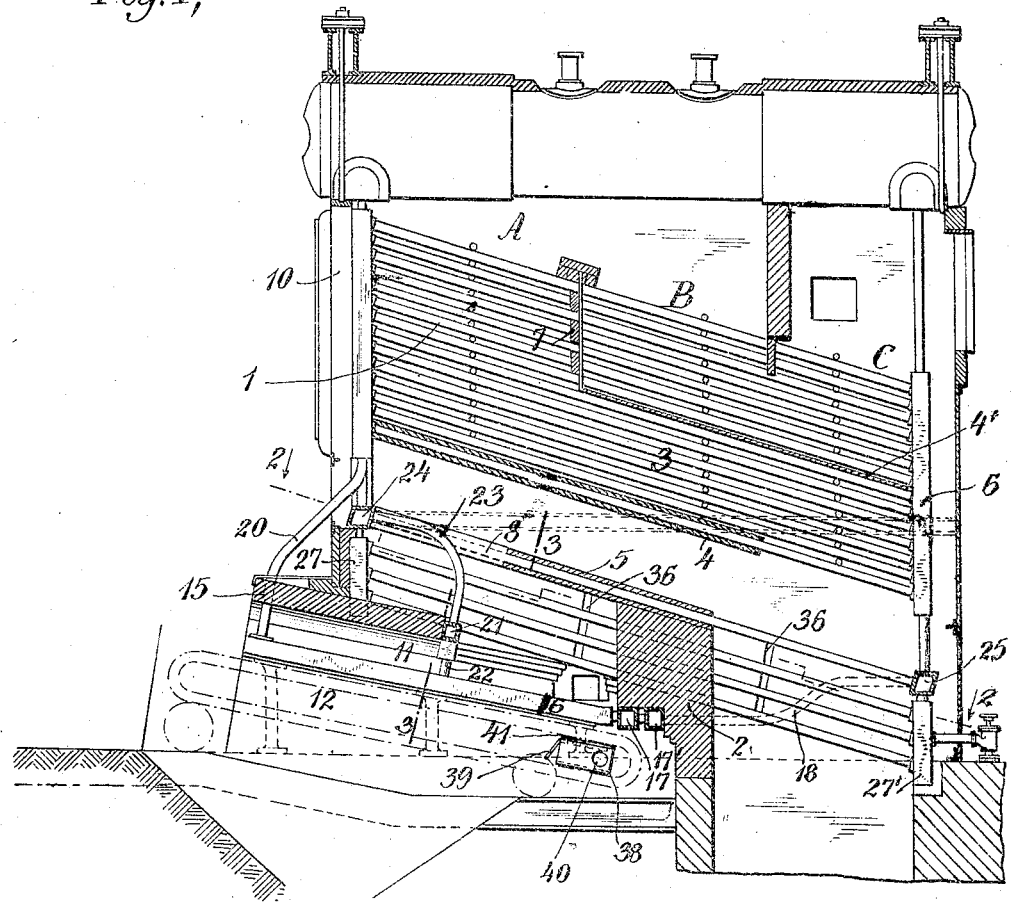
Fig. 2,
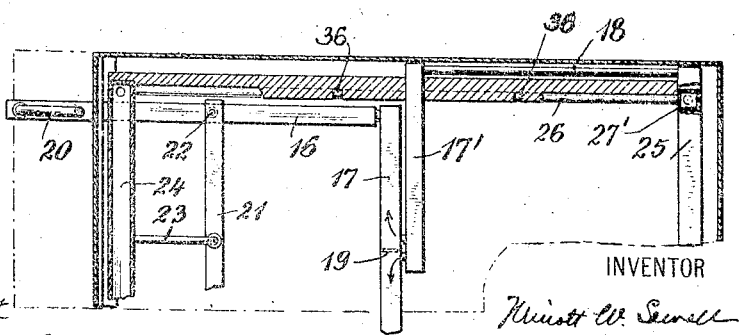
WITNESSES:
Arthur Goat
Oscar Ascher
INVENTOR
Minott W. Sewall
BY Gifford & Bull
His ATTORNEYS.

M. W. SEWALL.
BOILER FURNACE.
APPLICATION FILED MAR. 12, 1910.
1,007,805.
Patented Nov. 7, 1911.
2 SHEETS—SHEET 2.
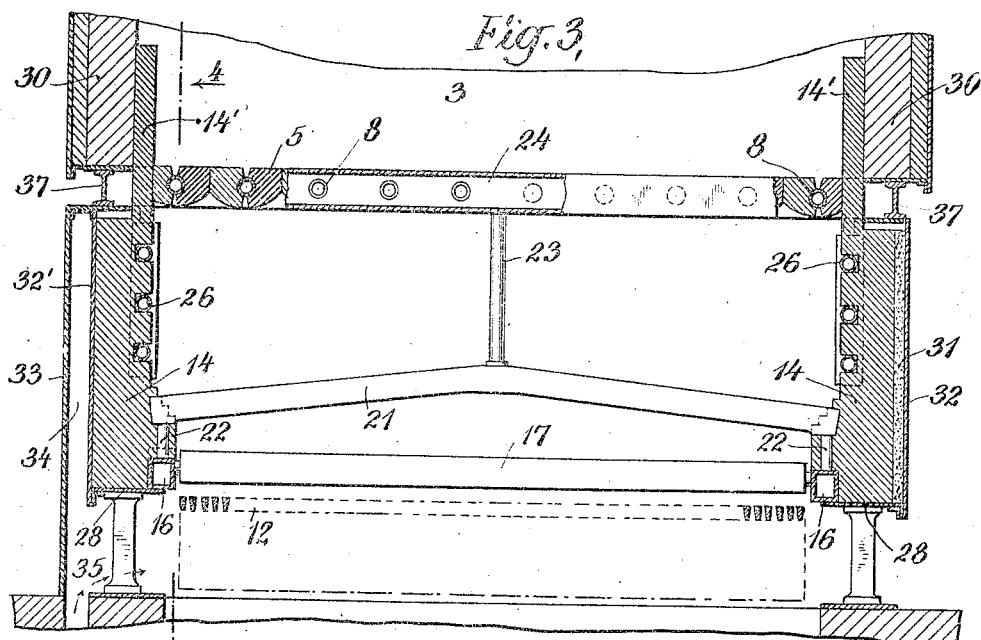
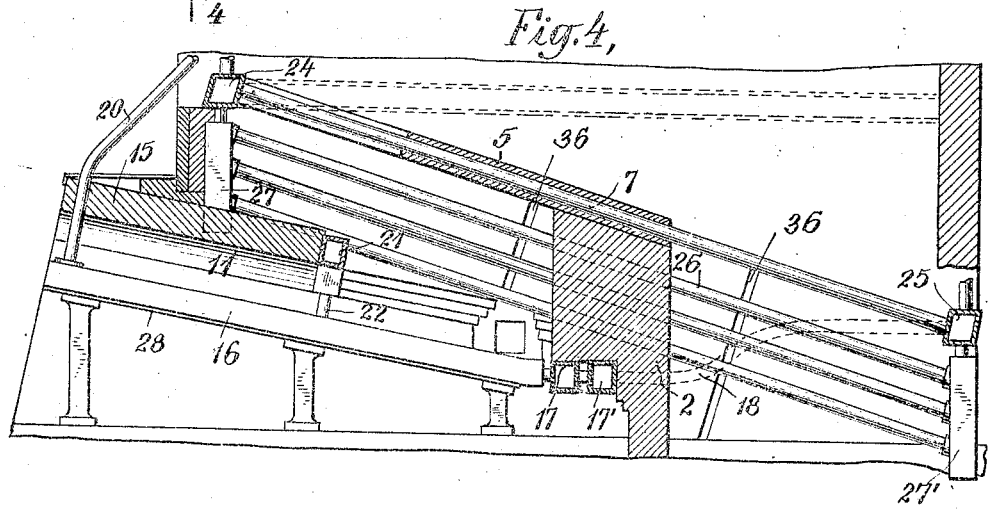
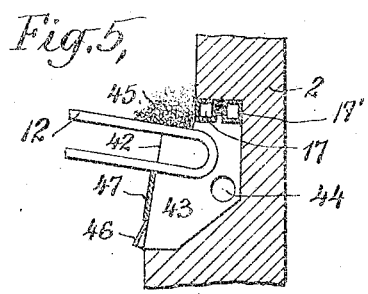
WITNESSES:
Arthur Goat
Oscar Ascher
INVENTOR
Minott W. Sewall
BY Gifford & Bull
his ATTORNEYS

UNITED STATES PATENT OFFICE.

MINOTT W. SEWALL, OF NEW YORK, N. Y., ASSIGNOR TO THE BABCOCK & WILCOX COMPANY, OF BAYONNE, NEW JERSEY, A CORPORATION OF NEW JERSEY.

BOILER-FURNACE.

1,007,805.

Specification of Letters Patent.  Patented Nov. 7, 1911.

Application filed March 12, 1910. Serial No. 548,821.

*To all whom it may concern:*

Be it known that I, MINOTT W. SEWALL, a citizen of the United States, residing in the borough of Manhattan, city of New York, in the county of New York and State of New York, have invented certain new and useful Improvements in Boiler-Furnaces, of which the following is a specification.

The usual methods of building and incasing brickwork for a boiler and furnace is to build up the walls from the floor line of the boiler room. The lower portion of these walls serves to inclose the ash pit or the space below the grate surface. A few inches below the level of the grate surface a fire brick lining to the walls is commenced which lining extends throughout the furnace and the greater portion of the interior of the side walls of the boiler. Fire brick arches are in some cases used over a portion, and in other cases over all of the grate area. In fact, the whole interior of a boiler furnace consists of fire brick walls and arches. A furnace well inclosed by fire brick surfaces is the most efficient furnace for the combustion of coal, and great pains have been taken to construct furnaces in such a manner that fire brick surfaces shall cover the fuel bed, or shall form a roof over the fuel bed. The fact that furnaces are thoroughly inclosed in fire brick surfaces is, notwithstanding its value for the processes of combustion, one of the most detrimental features to the life of the furnace. This is because such a furnace produces an exceedingly high temperature. The higher the temperature, the more perfect will be the combustion. On the other hand, the high temperature is exceedingly destructive to the furnace walls and such furnaces as have been described have a comparatively short life.

The object of this invention is to produce a furnace that will give results as nearly as possible to that of the inclosed fire brick furnace and at the same time have a much greater length of life, also one that, when necessity requires, may be repaired at low cost.

The usual furnace fails by the melting down of the fire brick itself or by disintegration in the brick-work caused by currents of cold air or moist air coming in contact with the highly heated surfaces. Another cause of failure is the adhesion to the furnace walls of clinker formed near the grate and of dust, that arises from the fire, adhering to the hot surfaces and becoming vitrified upon them and thus building up large masses of clinker which must later be removed by mechanical means. The removal of the clinker in the furnace is detrimental to the brick work because the surface of the brick becomes broken and later other clinker adheres to the fresh surface of the broken brick even more strongly than it does to the original surfaces. A further cause of deterioration is the expansion of the fire brick caused by the high temperature, which expansion causes cracking of the walls and disintegration of the brick in addition to allowing an infiltration of cold air to the furnace, which is in itself detrimental both to the life of the furnace and the efficiency of the boiler.

According to the present invention the furnace walls begin at the grate line rather than at the floor line. One of the advantages of this construction is that with the use of chain grate stokers ample air ducts may be introduced into the space ordinarily occupied by the walls and in cases where air ducts for forced blast are not required the space is very advantageous in obtaining access to the sides of the stoker for observation or for repairs. The usual custom is to build chain grates so that they may be moved out from under the boiler altogether for purposes of repair. The large floor area that is required, however, for this purpose becomes very expensive for large boiler installations and it is very desirable that it be not required to draw the stokers out more than a few feet, and in such cases access to the sides of the stokers, although not absolutely necessary, is a great advantage in operation.

In the accompanying drawings which illustrate one form of my invention Figure 1 is a vertical longitudinal section through the furnace and boiler; Fig. 2 a section on the plane of the line 2—2, of Fig. 1 with the bridge wall removed; Fig. 3 a section on the plane of the line 3—3 of Fig. 1; Fig. 4 a section on the plane of the line 4—4 of Fig. 3; and Fig. 5 a cross section of a modification.

Similar reference numerals indicate similar parts in the several views.

I have shown my invention in connection with a standard form of boiler construction so set that the gases, before coming into contact to a substantial extent with the water tubes, are carried below the first and second passes toward the rear of the boiler and thence back to the first pass among the tubes before entering upon the course that they have heretofore taken across the uptake end of the bank of tubes. With such construction I can, with highly volatile grades of bituminous coal, hold the flame substantially back from going among the tubes and still maintain the accustomed steaming capacity and efficiency of the boiler substantially without smoking and the nuisance incident thereto. In this construction the bank of inclined water tubes 1 is divided first horizontally and then the upper portion is divided into three transverse passes A, B and C, the grate being located substantially beneath the first pass A and the gases compelled to travel upward across tubes 8, then back over the bridge wall 2, and thence forward through the passage 3 formed by the baffles 4 and 4' to the first pass A at the steam uptake end of the boiler. The baffle 4' extends from the rear header 6 forward to the foot of the baffle 7 which separates the first pass A from the second pass B and is supported on an intermediate row of the bank of inclined tubes 1. The baffle 5 extends from the bridge wall toward the front of the furnace, and the baffle 4 extends beneath the first and second passes, and is supported by the lower water tubes of bank 1 which are embedded a part of their length in the baffle. The baffle 5 is constructed as described in a companion application of Davis S. Jacobus and myself Serial No. 542,417, filed February 7, 1910, so as to provide suitable openings to admit the gases from the furnace to the passage above the bridge wall.

The furnace comprises a fuel chamber 11 supplied with fuel by a chain grate 12, and inclosed by side walls 14 and an arch 15. Embedded in the side walls 14 are water boxes 16 having their lower surfaces approximately on the grate line and extending the full length of the fuel chamber. The water cooled surface afforded by so placing the boxes 16 prevents the formation of clinkers on the side walls of the furnace. Nippled to the boxes 16 at the back of the furnace is a water box 17 into which the water supply is introduced through box 17'. The box 17 is divided into two parts by a diaphragm 19 at its center (see Fig. 2) providing thereby two independent systems of circulation toward the water boxes 16, as indicated by the arrows. Water is discharged from the two side boxes 16 through pipes 20 which connect into the uptake circulation. A fourth water box 21 is placed at the rear of the furnace arch 15 and receives circulation from both water boxes 16 through nipples 22 and discharges through pipe 23 into manifold 24, which manifold receives the upper ends of the roof tubes 8. The lower ends of the tubes 8 are connected to box 25 which is nippled to the downtake headers 6. Pipe 18 receives its water supply from box 25 and leads to box 17' which is at its opposite end nippled to the two parts of box 17, the nipple being on each side of diaphragm 19.

Partially embedded in the furnace side walls 14 are tubes 26 connected to manifolds 27 and 27', these tubes and manifolds forming sections similar to boiler sections. These sections receive water through nippled connections with the lower box 25 and discharge through nippled connections into the upper box 24, or they may connect directly with headers 6 and 10, if roof tubes 8 are not used. The furnace side walls 14 are supported on the water boxes 16 and on structural work 28 which rests on a suitable foundation. These side walls 14 are independent of the boiler walls and may have upward extensions 14' lying inside of the boiler walls 30 in order to insure against any infiltration of air at the junction of the furnace and boiler walls. The walls 14 may be formed in various ways and may be thinner than is usual in good practice. As shown in Fig. 3, the right-hand wall 14 is shown built up of fire-brick having a covering 31 of magnesia or other non-conductor of heat backed by an external metallic casing 32. The left-hand wall 14 is shown as built up of fire-brick backed by an outer metallic casing 32'. These casings 32 may be secured in any suitable manner to the structural work 28 below and beams 37 above, such structural work, including a plate at about the level of the grate surface, extends from that point to the ground or floor line. An exterior plate 33 extends upward from the floor line on one side of the boiler and is also attached to beam 37. Between said plate and the left-hand wall 14 is an air chamber 34 which extends for a part or the full length of the furnace and is common with a space 35 through which air may be introduced under the grate for combustion, with a result that the radiation from the wall will pass into the air circulating within the closed chamber.

In order to prevent undue movement by expansion of the fire-brick walls 14, their inner sides are divided longitudinally by rectangular grooves in which the inclined tubes 26 are placed, and transversely or in a vertical direction by narrow grooves 36, all of said grooves extending partially through the fire-brick. The results of expansion are localized by breaking the continuity of the surfaces of the walls 14, and the portions of the walls that are farther from the fire are heated to a less degree and in consequence of this a continuous wall will be less liable to destruction on account of the lesser movement due to expansion. This division of the surfaces of the fire-bricks prevents the accumulative results of expansion from affecting the more distant portions of the wall. The water cooling parts of the furnace are embedded as much as is practicable within the brick-work so that the surfaces directly exposed to the heat of the furnace are of as small an area as is possible; thus the boxes 16 and 17 are exposed only on one side; the box 21 is exposed on two sides only; and the tubes 26 are exposed only as shown in Fig. 3.

The furnace walls are relieved entirely of the weight of the boiler walls by the beams 37, these beams being supported on columns not shown in the drawing. By making the furnace walls separate it is easy to repair them without affecting the boiler walls, and by reducing their thickness the repair becomes a matter both simple and inexpensive. As shown in Fig. 2, the furnace walls 14 are stopped short of the beams 37 to prevent any crushing effect from their expansion.

The weight of the arch 15 is carried on the structural work 28 by means of either fire-brick or metallic skew backs which skew backs will be held in position by the usual method of buck-staying across the furnace.

At times in the operation of a furnace equipped with chain grate the fire becomes heavily banked in front of the bridge wall, as shown at 45 in Fig. 5. Such a bank frequently becomes so thick that the draft through the fire at that point is cut off almost entirely, with the consequence that the bank has a tendency to increase. In order to be able to reduce this bank of incandescent coal without in any means disturbing the other portions of the fire, and without the use of fire tools, it is desirable to be able to force an extra quantity of air through it. To that end a closed box 38 is introduced into the furnace under the grate in which an air pressure above that under the remaining portions of the grate may be created. 40 indicates an inlet through which air may be forced by a steam jet or other means. The box may have adjustable openings on the top, controlled by slide 41, so that only a portion of the fire will be under the influence of the pressure within the box. A damper 39 may be attached to an open side of the box so that it may, by opening slide 41 and damper 39, be under the same influence of pressure or draft as the remaining portion of the furnace below the grate. This purpose may also be accomplished by the construction shown in Fig. 5 in which 2 is the bridge wall, 12 the stoker, 17 the water box, 42 a diaphragm across the stoker between the strands of the chain, which, together with wall 47, forms the inclosed ash pit chamber 43. 44 represents an opening through which air pressure may be introduced into chamber 43 in excess of that which exists under the remaining portion of the grate. This is for the purpose of forcing air through a heavy bank of fire represented at 45 which, at times, forms in front of the water box. By means of damper 46 atmospheric pressure may be admitted to chamber 43, if desired.

From the foregoing description it will be seen that, in addition to the advantages already spoken of, by this construction the deterioration of the furnace walls by cracking and disintegration will be confined to the walls of the furnace itself rather than being projected upward into the walls of the boiler as is the case where the boiler walls are a continuation of the furnace walls. It will be seen also that cracking of the boiler walls themselves cannot be continued downwardly into the furnace walls, but each of the two sets of walls is entirely independent from the other.

What I claim and desire to secure by Letters Patent of the United States is:—

1. A boiler furnace having walls consisting of lower sections forming side walls for the fuel chamber, upper sections inclosing the heating surfaces, said lower sections being under and extending upwardly to but not supporting the upper sections, and a support for said upper sections.

2. A boiler furnace having walls consisting of lower sections forming side walls for the fuel chamber, upper sections inclosing the heating surfaces, said lower sections over-lapping said upper sections but not supporting the same, and a support for said upper sections.

3. A boiler furnace having walls consisting of lower sections forming side walls for the fuel chamber, upper sections inclosing the heating surfaces, said lower sections over-lapping said upper sections but not supporting same, and protected by water tubes embedded therein, and a support for said upper sections.

4. A boiler furnace having walls consisting of lower sections forming side walls for the fuel chamber, supports for said sections consisting of structural work terminating at substantially the grate level, upper sections inclosing the heating surfaces, said lower sections extending upwardly to but not supporting the upper sections, and a support for said upper sections.

5. A boiler furnace having side walls composed of water boxes extending the length of the fuel chamber beginning at the grate level, brick-work above the water boxes, and water pipes extending from approximately midway longitudinally of the side walls toward the rear.

6. A boiler furnace having its brick-work protected by side water boxes beginning approximately at the grate level and extending upwardly, said boxes extending longitudinally the length of the fuel chamber, a cross box at the rear of the fuel chamber connected at its ends to the rear ends of the side boxes, a water box extending across the fuel chamber at the rear end of a brick arch and having its ends nippled to the upper sides of the side boxes, water supply tubes leading from the downtake circulation of the boiler into the lowest part of the system of boxes, and circulation tubes extending from the highest points of this combination of boxes to the uptake circulation of the boiler.

7. A boiler furnace having a water box system of protection for the walls extending from the grate-surface upwardly, said system comprising a cross box at the rear of the grate, said box being divided by a lateral partition and having inlet connections at each side of the partition, side boxes extending longitudinally of the furnace, each side box being connected to the cross box at one end and to an outlet connection at its other end, and water supply and delivery pipes secured respectively to said inlet and outlet connections.

8. A boiler furnace having a chain grate, side walls beginning at substantially the grate level so that the grate is accessible at its sides beneath said walls, water boxes set into the side walls immediately above the grate and parallel therewith, and water tubes extending longitudinally of the furnace for the protection of the walls above said boxes, and means for supplying water to said boxes and tubes.

9. A boiler furnace having side walls composed of water tubes embedded in brick work, a metal plate on the outer surface of said brick work, a second metal plate forming an air chamber with the first-named plate, and a connection between said chamber and the air inlet to the furnace.

10. A boiler furnace having side walls consisting of fire brick, a metal plate on the outer surface of the brick work, a second metal plate forming an air chamber with the first-named plate, and structural work to which said metal plates are attached so that but one thickness of metal can exist between the furnace lining and the atmosphere.

11. A boiler furnace having a grate, a bridge wall, side walls, a roof extending from the bridge wall toward the front, a secondary roof higher than the aforesaid roof extending from the front of the upper part of the furnace rearwardly and inclosing a downwardly inclined passage above the first roof.

12. A boiler furnace having a grate, a bridge wall, side walls, an inclosed downwardly inclined passage above the roof and an expansion chamber behind the bridge wall.

13. A boiler furnace having a grate, side walls beginning at substantially the grate level, open structural work supporting said side walls so as to make the grate accessible below the side walls, a water box and tubes set into the side walls, an outer protecting metal plate, a second metal plate surrounding the furnace walls forming an air chamber opening into the conduit leading to the space beneath the grate.

14. In a boiler furnace, furnace walls comprising a metal casing consisting of plates at substantially the grate level, side plates connected thereto at the outer edges and extending upwardly terminating at the top in structural work having a single thickness of metal between an upward extension of the furnace brick work and the interior of the furnace, said upward extension projecting beyond the lower edge of the boiler wall and making an air-tight connection therewith.

15. A boiler furnace having a water box system of protection for the walls extending from the grate surface upwardly, said system comprising a cross box at the rear of the grate, side boxes extending longitudinally of the furnace, each side box being connected to the cross box at one end and to an outlet connection at its other end, and water supply and delivery pipes secured respectively to said inlet and outlet connections.

In testimony whereof I have hereunto signed by name in the presence of two subscribing witnesses.

MINOTT W. SEWALL.

Witnesses:
 HUGH McDOUGALL,
 LUTHER D. PRATT.